United States Patent [19]

Haubein et al.

[11] 4,083,028

[45] Apr. 4, 1978

[54] PAD-MOUNTED DOUBLE-FUSED VACUUM SWITCHGEAR

[75] Inventors: Harold D. Haubein; George D. Allen; Robert W. Harmon; Edgar J. Ramsey, Jr., all of Centralia; Ronald C. Pehle, Mexico, all of Mo.

[73] Assignee: A.B. Chance Company, Centralia, Mo.

[21] Appl. No.: 640,916

[22] Filed: Dec. 15, 1975

[51] Int. Cl.² .......................................... H01H 71/20
[52] U.S. Cl. .................................. 337/144; 337/162; 200/333; 337/247
[58] Field of Search ............... 337/144, 186, 158, 187, 337/159, 196, 161, 162, 217, 247, 218, 226; 335/156; 361/41; 200/144 B, 50 A, 333; 70/240; 292/259–262, 338

[56] References Cited

U.S. PATENT DOCUMENTS

| 2,736,598 | 2/1956 | Laffey | 292/338 |
|---|---|---|---|
| 3,078,001 | 2/1963 | Young et al. | 292/338 X |
| 3,340,441 | 9/1967 | Probert | 200/50 A X |
| 3,522,404 | 8/1970 | Trayer | 337/186 X |
| 3,699,490 | 10/1972 | Macemon | 337/202 |
| 3,792,215 | 2/1974 | Keto | 337/186 X |

*Primary Examiner*—George Harris
*Attorney, Agent, or Firm*—Schmidt, Johnson, Hovey & Williams

[57] ABSTRACT

Pad-mounted double-fused switchgear especially adapted for use in underground distribution systems is provided which includes an oil tank having manually operable vacuum switch apparatus therein in conjunction with closely adjacent, series-connected, combination current limiting fuse-expulsion link protective fuse structure for maintaining the required momentary electrical rating of the overall switch apparatus notwithstanding of a relatively low-rated switch element, and for providing thermal protection for the switchgear. Double-fusing within the oil tank also serves to reduce electrical duty on upstream and downstream equipment, increases the interruption rating of the switchgear, and enhances overall system coordination. In preferred forms the expulsion link is temperature sensitive and is constructed to actuate only at relatively low fault current levels while remaining intact during high-level faults which actuate the backup current limiting fuse; in this manner effective total range fuse protection is maintained and the extent of attendant oil contamination is lessened since the expulsion link operates only during low level fault-clearing situations. Novel fuse well-double fuse assemblies adapted for use with pad-mounted electrical apparatus are also disclosed, along with structure for selectively holding the tank lid of such apparatus open against inadvertent closing thereof which can occur during high wind conditions.

13 Claims, 9 Drawing Figures

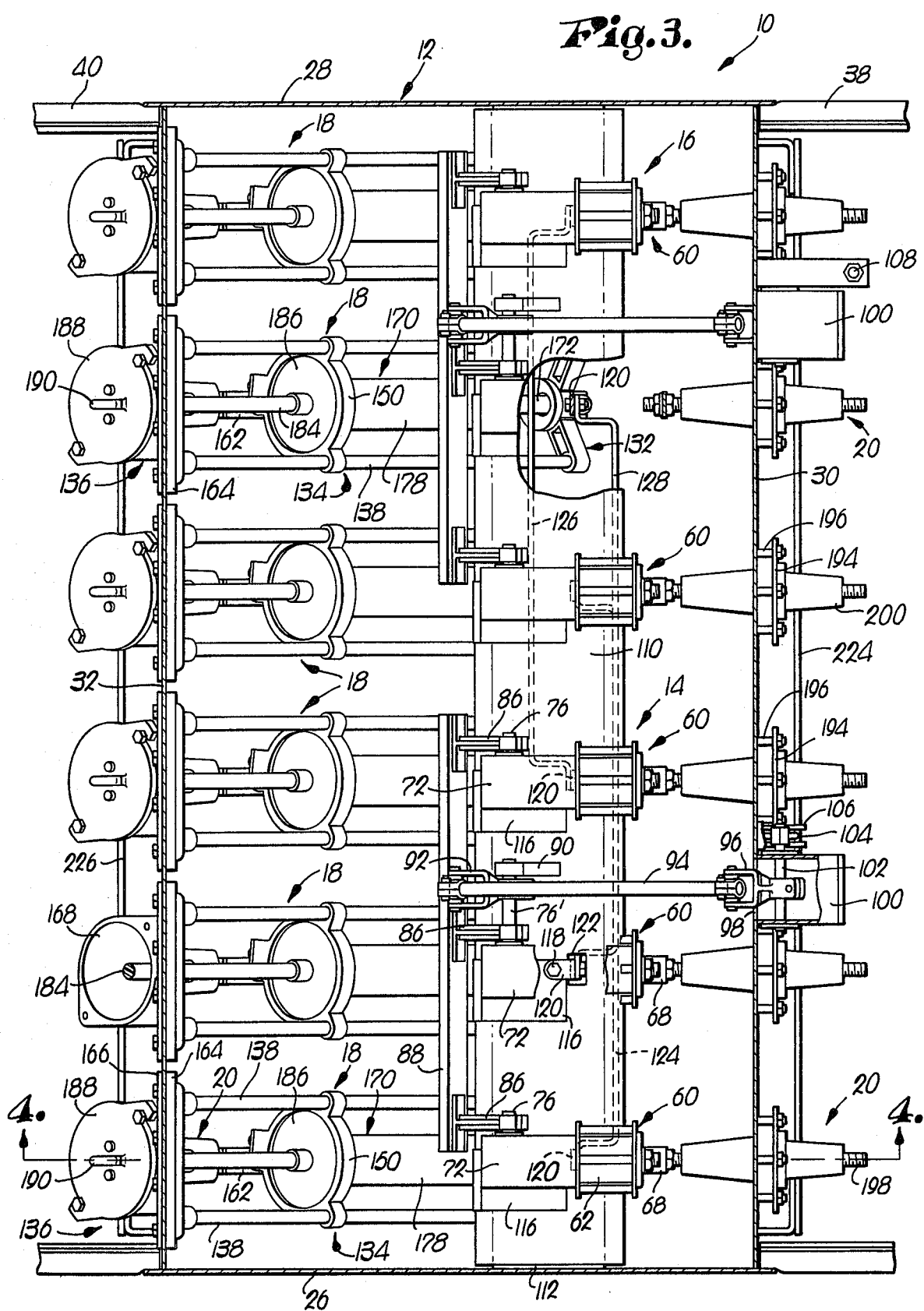

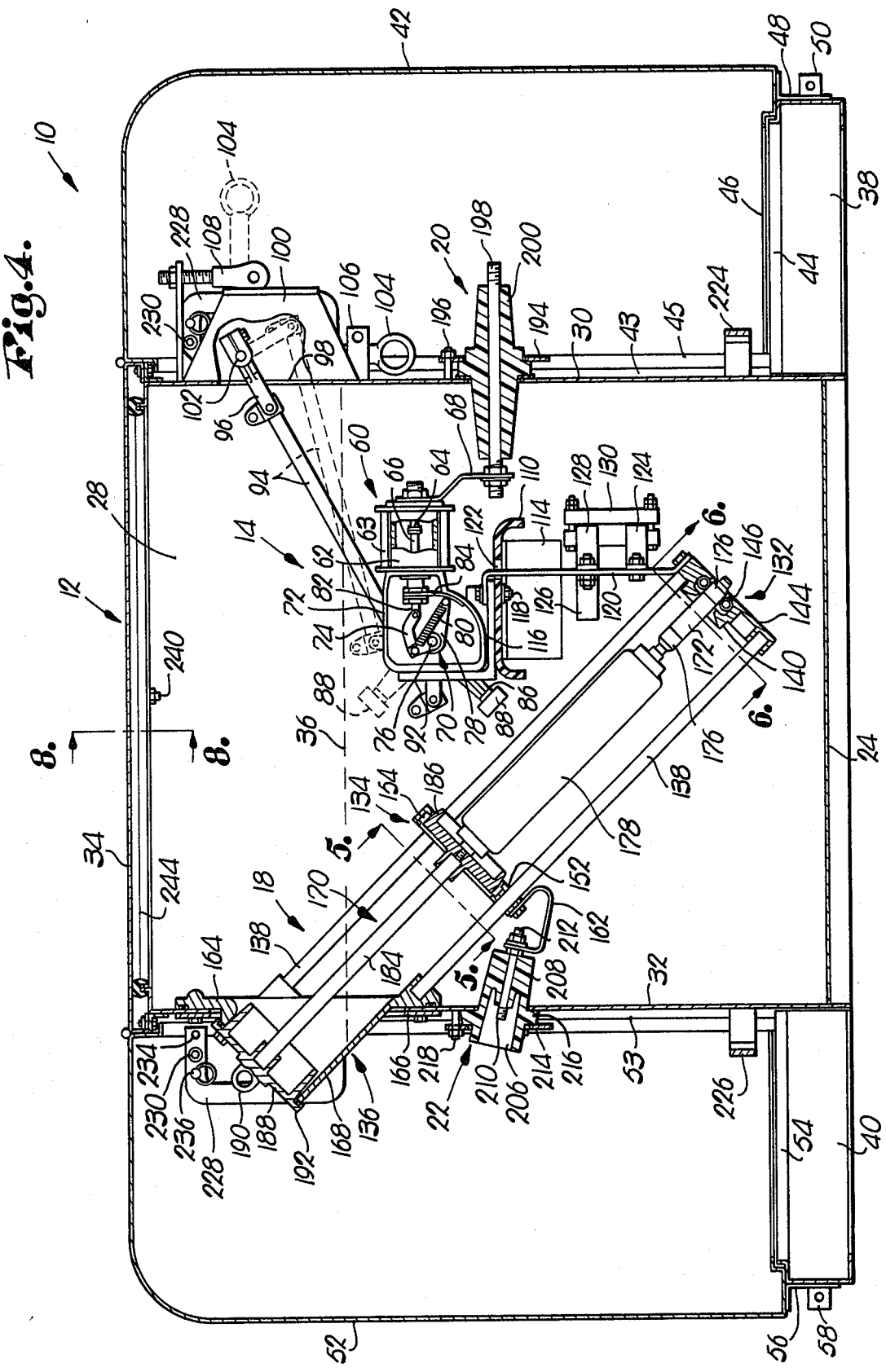

PAD-MOUNTED DOUBLE-FUSED VACUUM SWITCHGEAR

This invention relates to pad-mounted, fuse-protected switchgear apparatus of the type preferably used in underground distribution systems. More particularly, it is concerned with switchgear apparatus including oil-submerged switch elements, in conjunction with adjacent, submerged, current limiting fuse-expulsion link fuse assemblies serving to protect the switchgear and both downstream and upstream electrical apparatus from the effects of fault currents while at the same time enhancing overall system coordination.

In recent years, there has been a trend in the electrical industry to install underground transmission and distribution systems, as opposed to those strung overhead. One important reason for this development stems from the fact that underground systems are felt to be more aesthetically pleasing, especially in residential and commercial areas. In addition, increasingly heavy user demand has made it imperative that utilities uprate their underground systems in order to safely accommodate higher current and voltage loads. As a consequence, a large amount of research and development work has been done in developing so-called pad-mounted electrical devices for use in underground systems which are capable of handling relatively heavy electrical loads. For example, pad-mounted distribution transformers and switchgear apparatus have been developed in recent years in order to meet the need of present-day underground systems.

One problem encountered in connection with pad-mounted distribution switchgear stems from the requirement that such apparatus be of relatively small size. As can be appreciated, with increasingly heavy current load it becomes necessary either to enlarge the size of the switchgear apparatus in order to handle the load or take other measures to ensure safe operation. The first alternative is objectionable from a cost and aesthetic standpoint, while the other measures heretofore available have not completely solved the safety problem. Furthermore, since the switchgear is conventionally positioned at grade on a concrete or other type of footing, any pad-mounted switchgear device should preferably be safe in operation and relatively tamper-proof in order to lessen the possibility that children or others in the vicinity of the switchgear become accidentally electrocuted.

In addition to the foregoing, pad-mounted switchgear and related protective devices such as fuses for example should preferably be the type to enhance, or at least not measurably detract from, desirable system coordination. Basically, protection on a coordinated basis implies a series of "zones" along the system protected at different fault levels. For example, from a substation there is generally a circuit breaker or power fuse. Going down the circuit away from the substation are sectionalizing devices such as reclosures or cutouts, and switchgear for opening and closing branch lines as needed. The various zones along a coordinated system are conventionally fused at a lesser value than the circuit breaker of the substation, but at a greater value than equipment further down the circuit. In this manner each system zone is protected by fuses or the like having varying minimum melting and total clearing times so that extremely good coordination of protection along the entire system is achieved. As can be appreciated, any switchgear or like device to be used in present day distribution systems should be of the type to facilitate and maintain coordinated protection, since this is an important feature in maintaining safe and effective operating conditions.

It is therefore the most important object of the present invention to provide switchgear apparatus especially adapted for use in loop-type underground electrical distribution systems and which is fuse-protected in a manner to adequately protect the overall apparatus as well as both downstream and upstream electrical equipment from the full range of fault currents experienced in practice while moreover enhancing overall system coordination and protecting the system from the potentially disastrous effects of high level fault currents.

Another aim of the invention is to provide pad-mounted switchgear having a double-fused, series-related, oil-submerged fuse assembly which is positioned in close physical proximity to the switch elements of the switchgear for maintaining the required momentary electrical ratings of the overall switch apparatus notwithstanding use therein of relatively low-rated switch elements; the preferred use of a combination current limiting fuse-expulsion link protective assembly also serves to increase the interrupting capability of the switchgear as compared with conventional, present-day pad-mounted switchgear.

Another object of the invention is to provide oil-submerged, series-connected, current-limiting fuse-expulsion link protective assemblies for the switchgear wherein the expulsion link is in addition to being fusible under the influence of fault currents, temperature sensitive for interrupting current flow in the event of high oil temperatures to protect the switch elements, and wherein the expulsion link is designed to operate only during relatively low-level faults so that oil contamination attendant to link fusing is minimized.

Another object of the invention is to provide double-fused switchgear apparatus of the type described which includes a double-fuse assembly having a high-range current limiting fuse in combination with a series-related low-range expulsion fuse link interrupter in order to provide a full range protective assembly having an appropriate, relatively narrow $I^2t$ band response over the entire fault range for effectively protecting switched branch circuits and other upstream and downstream electrical components without impairing desirable system coordination.

A still further object of the invention is to provide a fuse well-double-fuse assembly adapted for use with pad-mounted electrical equipment which includes a removable bayonet assembly connected to the double-fuse structure for facilitating removal and refusing of the electrical apparatus while moreover stabilizing the fuse assembly and ensuring that the latter remains in its intended protective, current-carrying disposition during use thereof.

Finally, another object of the invention is to provide pivotally mounted, generally C-shaped support structure adapted to be mounted adjacent the cover of a pad-mounted electrical device such as a transformer or switchgear and which is selectively shiftable to a movement-blocking disposition for ensuring that the open cover of the electrical device remains open even during high wind conditions so that work around the electrical equipment can proceed without fear of injury due to inadvertent closing of the cover.

In the drawings:

FIG. 3 is a fragmentary top plan view of the switchgear apparatus depicted in FIGS. 1 and 2, shown with the top thereof removed and with certain parts broken away for clarity;

FIG. 4 is a vertical sectional view taken along 4—4 of FIG. 3 and illustrating in detail one of the vacuum switch-double fuse assemblies of the overall unit;

Figure 1:
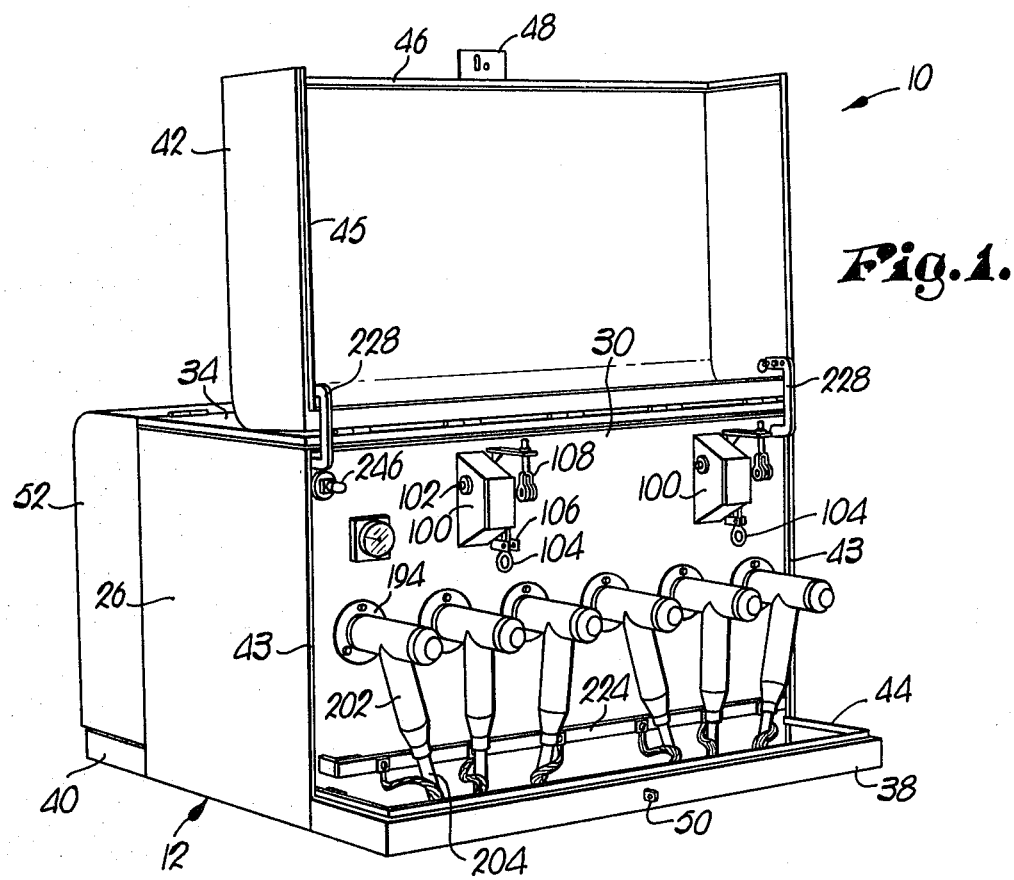
FIG. 1 is a perspective view of the double-fused switchgear apparatus of the present invention, shown with one end cover thereof opened.

Switchgear 10 in accordance with the invention is illustrated in FIGS. 1-4 and broadly includes an enclosed oil tank 12, two series-connected switch banks 14 and 16 each containing three electrically separate vacuum switch elements, with six identical fuse well-double fuse assemblies 18 which are each electrically connected to a respective switch element on the load side of the latter. Finally, six primary line bushings 20 and six tap line bushing walls 22 extend through opposite walls of tank 12 and are electrically connected to the switch elements and fuse assemblies respectively for completing the electrical current paths through switchgear 10. Although the switchgear illustrated in the drawings is adapted for use in three-phase, closed or open loop distribution systems, it is to be understood that single phase switchgear, and switchgear for use in radial-type systems, could also be provided by appropriate modification of the illustrated apparatus.

In more detail, switchgear 10 is constructed to rest on a pad (not shown) such as a concrete footing or the like and includes the central, enclosed oil tank 12 having a bottom wall 24, spaced upright sidewalls 26 and 28, and apertured front wall 30, an apertured rear wall 32, and a removable lid 34. Tank 12 is adapted to hold a supply of fluid dielectric material such as oil, which as will be explained is preferably maintained at a level 36 sufficient to cover the operative switch and fuse assemblies within tank 12.

Identical, open, cover-engaging framework 38 and 40 respectively extends from each wall 30 and 32 in order to provide an open area adjacent and below the primary bushings 20 and tap line bushing wells 22 permitting the associated underground cables to be threaded upwardly into switchgear 10 for connection thereto as will be explained. As best seen in FIG. 4, bottom wall 24 of tank 12 is raised relative to the pad-engaging lower margins of the frameworks 38 and 40. This spacing is provided so that a corrosion-resistant coating such as coal tar epoxy can be placed on the bottom of tank 12 for corrosion prevention.

An openable cover 42 is hingedly mounted to lid 34 adjacent wall 30 and can be opened as best seen in FIG. 1 in order to provide access to the line connections and operating mechanisms on front wall 30. In this regard, the side margins of wall 30 and framework 38 include flanges 43 and 44 which are received within complementary recessed areas defined by wall sections 45 and 46 in the side and bottom recessed margins of cover 42 in order to render cover 42 relatively tamperproof. Furthermore, cover 42 and framework 38 carry mated latching elements 48 and 50 in order to permit secure locking of cover 42 in the closed position thereof.

Figure 2:
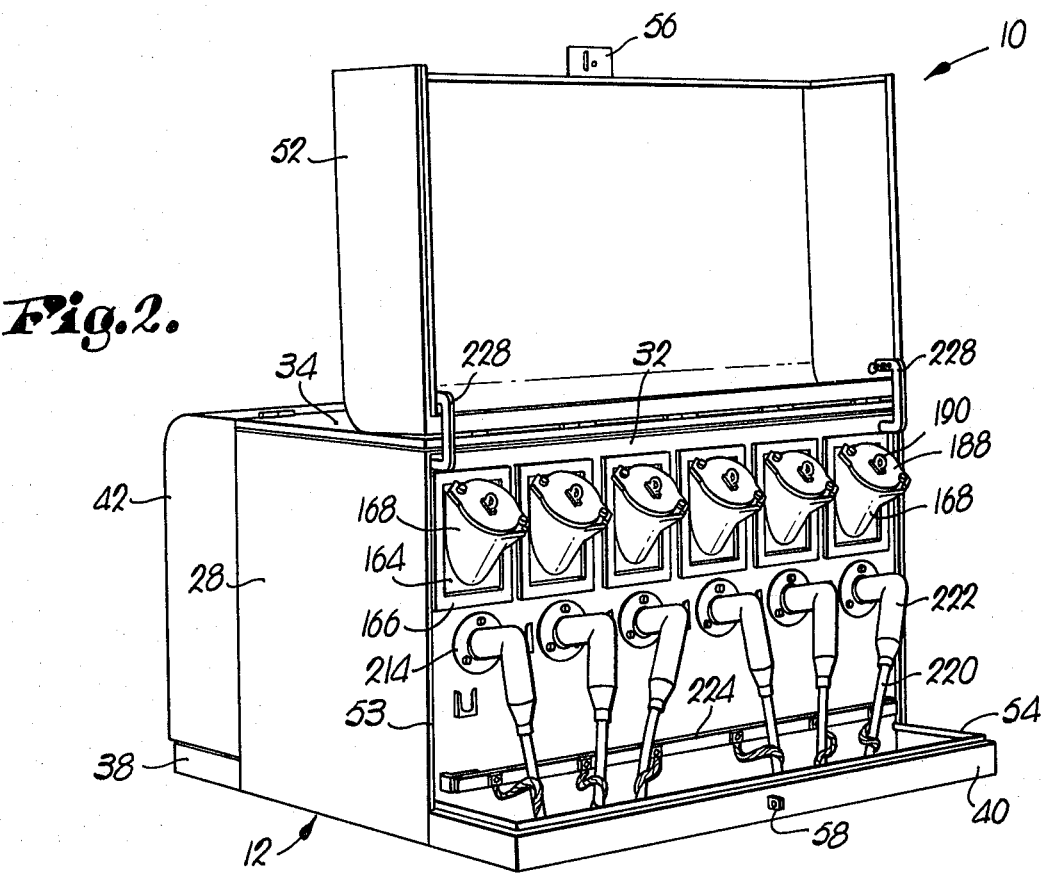
FIG. 2 is a perspective view similar to that of FIG. 1 but showing the opposite end thereof and with the opposite end cover in its open, locked disposition.

An identical, openable cover 52 is hingedly mounted to lid 34 adjacent rear wall 32 in order to provide selective access to the fuse assemblies and tap line bushing wells extending through wall 32 (see FIG. 2). In this respect, the side margins of wall 32 and framework 40 include flanges 54 which are received by the recessed side and lower margins of cover 52, and the latter carries a latching element 56 which mates with a complementary latch element 58 on framework 40 for permitting secure locking of cover 52 as desired.

Each switch bank 14 and 16 includes three electrically separate, identical vacuum switch elements 60 of the type illustrated in U.S. Pat. No. 3,562,454. Each element 60 (FIG. 4) includes a vacuum housing 62 supported by mounting structure 63 and has stationary contact 64 and a movable contact 66 relative to contact 64 without breaking the vacuum within which the two contacts are disposed. Stationary contact 64 is electrically connected in series with a corresponding primary line bushing 20 by means of a conductive strap 68, while movable contact 66 is operatively connected to operating mechanism 70 disposed within housing 72 attached to the rearward end of vacuum housing 62. Operating mechanism 70 is of conventional construction and includes a quick-acting toggle mechanism comprising a first link 74 pivotal on shaft 76 and a second link 78 keyed to and carried by the shaft. The links 74 and 78 are operatively interconnected by means of a pair of side-by-side toggle springs 80, and link 74 is pivotally joined to switch operating rod 82 which is in turn connected to movable contact 66. An electrically conductive strap 84 is disposed for electrical contact with movable rod 82 so that a current path through contacts 64 and 66 and housing 72 is maintained.

The three switch elements making up each bank 14 and 16 thereof are connected together for opening and closing operation in unison. Referrings to FIGS. 3 and 4, it will be seen that each switch element 60 includes an operating arm 86 secured to the shaft 76 (which extends through a sidewall of housing 72). The respective operating arms 86 are each connected to a common, elongated bar 88 such that upon movement of the bar the respective operating arms are rotated in unison which in turn causes the individual toggle mechanisms 70 to simultaneously open or close the switch contacts of the individual elements 60.

Referring specifically to the central switch element 60 in bank 14 (FIG. 3), it will be seen that the shaft 76' is of somewhat greater length than the shafts 76 of the adjacent switch elements. Shaft 76' extends outwardly from the associated housing 72 and is rotatably supported at the outermost end thereof by means of a bracket 90. In addition, a yoke 92 is keyed to shaft 76' intermediate the ends of the latter so that upon rotation of the yoke the shaft 76' and operating arms 86 of the individual elements 60 rotate together. An elongated, insulative rod 94 is pivotally secured to yoke 92 and extends towards front wall 30. Another yoke 96 is pivotally secured to rod 94 adjacent the upper end thereof, with yoke 96 extending through an aperture 98 in wall 30. As best seen in FIGS. 3 and 4, an external housing 100 mounted on wall 30 covers aperture 98 and the protruding end of yoke 96. A rotatable pin 102 extends transversely through housing 100 and has yoke 96 pivotally mounted thereon as illustrated in the drawing. Finally, an operating arm 104 is keyed to pin 102 externally of housing 100 and respective latch elements 106 and 108 are provided for locking arm 104 in the switch-closed and switch-open positions thereof illustrating in FIG. 4.

Referring again to FIGS. 3 and 4, it will be seen that both switch banks 14 and 16 are mounted on an elongated, transversely extending, insulative support member 110 which extends completely across tank 12 and is secured in place by means of attachment to end flanges 112 and 114 respectively secured to sidewall 26 and 28. In addition, since each bank 14 and 16 is identical in terms of the switch operating mechanisms and the like, a description of the structure in connection with bank 16 will be omitted; however, like reference numbers used with respect to each switch bank refer to identical parts in each case.

Each switch element 60 in the separate banks 14 and 16 is mounted on a generally L-shaped metallic bracket 116 which is secured to underlying support member 110 by means of bolt and nut assembly 118 and other connective structure. In addition, an elongated, downwardly extending, conductive strap member 120 is secured to each bracket 116 by volt 118 and extends through an adjacent aperture 122 in support 110. Member 120 is connected at the lowermost end thereof to the fuse well of assembly 18 later to be described. Finally, transversely exending, conductive buss straps 124, 126 and 128 are connected between corresponding pairs of switch elements in each bank 14 and 16 thereof in order to series-connect the switch elements in a three-phase relationship. A two-piece, non-conductive spacer bracket 130 extends between adjacent buss straps 124 and 128 for preventing inadvertent contact between the straps which could otherwise result during high level fault situations by virtue of intense electromechanical forces generated in the straps.

As can be seen from the foregoing the current paths through the respective switch elements 60 extends from the straps 68 and through separable contacts 64 and 66, strap 84, housing 72, bracket 116 and strap 120. Also, each element 60 in bank 14 is series connected to the corresponding element in bank 16 by means of the buss elements 124, 126 and 128 in order to permit installation of switchgear 10 in a loop-type electrical distribution system.

The switch opening and closing operations of the switch banks 14 and 16 can best be seen from a study of FIG. 4 wherein the switch-closed position of the operating structure is depicted in bold lines, and the switch-open position thereof is illustrated in phantom. In particular, when it is desired to open one of the switch banks 14 or 16, operating arm 104 is grasped and pulled upwardly until it engages upper latch element 108. This causes rod 94 to pivot about the pivotal yoke connection points which results in rotation of shaft 76' and thereby all of the arms 86. Such arm rotation results in operation of the individual toggle mechanisms 70 in the well-known manner for quickly breaking contacts 64 and 66 within the respective vacuum housings 62. Of course, by virtue of the vacuum maintained within the housings 62, a relatively small break distance between the contacts is sufficient to interrupt current flow.

Each fuse well-double fuse assembly 18 broadly includes a conductive base 132, an annular conductive midsection 134 and a generally tubular upper section 136 which extends through rear wall 32 for providing access to the protective fuses. A plurality of elongated, insulative synthetic resin rods 138 extend between the three sections of the fuse well assembly for maintaining the latter in spaced, generally axially aligned disposition with the base 132 and midsection 134 being electrically separate.

Figure 6:
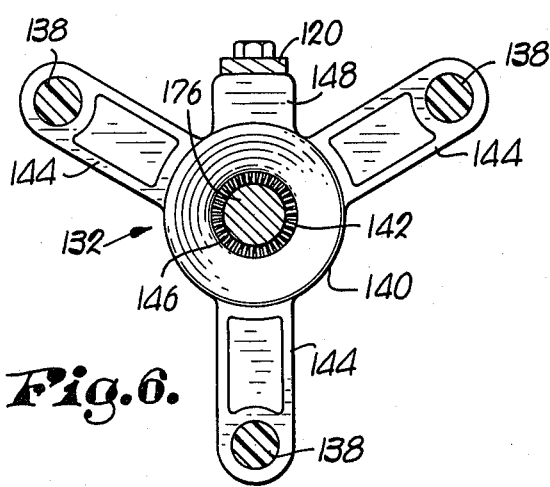
FIG. 6 is a sectional view taken along line 6—6 of FIG. 4 and illustrating the lowermost section of the fuse well assembly.

Referring specifically to FIGS. 4 and 6, it will be seen that base 132 includes a central hub section 140 having an aperture 142 therein. In addition, three radially extending, equidistantly spaced arms 144 extend from hub section 140 and receive the stabilizing rods 138. A circular garter spring 146 is seated within the aperture 142 for ensuring an adequate tensioned electrical contact with the end of the fuse assembly inserted within aperture 142. Finally, structure 148 extending from hub 140 is provided for facilitating connection of base sections 132 and conductive strap 120 forming a part of the associated switch element 60 (see FIG. 4).

Figure 5:
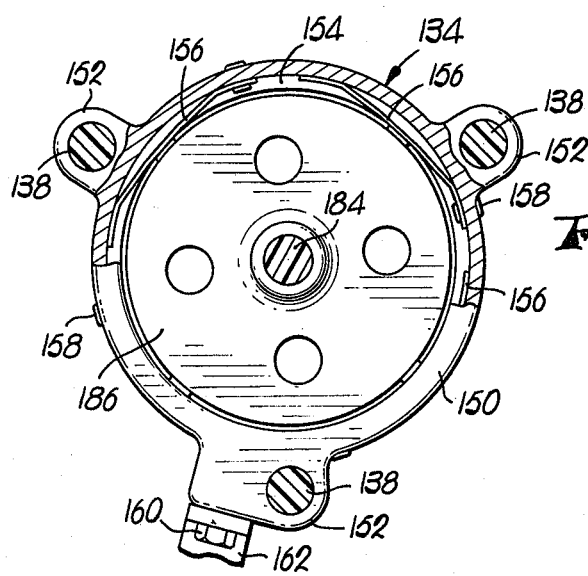
FIG. 5 is a sectional view taken along line 5—5 of FIG. 4 and illustrating in detail the central section of the fuse well assembly.

Midsection 134 (FIG. 5) is in the form of an annular metallic ring 150 having three radially protruding, equidistantly spaced ears 152 thereon for receiving the rods 138 intermediate the lengths of the latter. Ring 150 includes a peripherally extending recess 154 which houses four equidistantly spaced, metallic spring-type electrical contacts 156 which are secured to ring 150 by means of rivets 158. Finally, one ear 152 on ring 150 is bored to receive a bolt 160 in order to permit securement of a conductive strap 162 leading to a corresponding tap line bushing well 22 as best seen in FIG. 4.

Upper section 136 includes a generally rectangular mounting plate 164 adapted to fit within a complementary opening in rear wall 32 and be attached to the latter by means of bolted, circumscribing external flange 166. The plate 164 includes an obliquely oriented tubular section 168 which has an open top and leads into the interior of tank 12. In addition, apertures are provided about the periphery of the tubular section 168 for receiving the three circumferentially spaced stabilizing rods 138.

Assembly 18 also includes a double-fuse assembly 170 positioned within the well and in electrically bridging current-carrying disposition to base section 132 and midsection 134. In detail, the removable fuse assembly 170 includes a lowermost elongated fuse link tube 172 having an expulsion type fuse link 174 (see FIG. 9) disposed therein in the conventional manner. Tube 172 is provided with spaced electrical contact bands 176, with the lowermost bands serving to engage garter spring 146 to ensure current flow through link 174. An encapsulated current limiting fuse 178 is mounted on the upper end of tube 172 by means of a conventional threaded connection (not shown) so that the two fuses of assembly 170 are in series electrical relationship.

Current limiting fuse 178 is preferably of the high-range variety (i.e., constructed to actuate only during high level faults) and is of the type disclosed in U.S. Pat. No. 3,863,187 which is incorporated herein by reference. In general, fuse 178 includes an elongated silver fusible element 180 (FIG. 9) spirally wound about a lightweight, finned synthetic resin saddle member 182 and disposed within a sealed housing along with pulverulent arc-suppressing silica sand. In addition, the internal fuse assembly is encapsulated within a conventional synthetic resin encapsulant for ensuring that current limiting fuse 178 is air-and oil-tight. Other details of the construction of preferred current limiting fuse 178 are to be found in the above-referenced U.S. Pat. No. 3,863,187.

In preferred forms, fuse link 174 is of the type which is designed to actuate in response to a relatively low level fault in the known manner, and also to a rise in temperature within the tank in order to prevent thermal damage to the switch elements or other components within switchgear 10. This latter type of protection could be important in situations where high temperatures are generated in tank 12 notwithstanding absence of a fault current. In addition, fuse link 174 and current limiting fuse 178 are preferably cooperatively designed such that during relatively high fault current situations (e.g., above 2000 amps), only the current limiting fuse element will actuate and not fuse link 174. This type of fuse protection is preferred since during high fault situations there will be no contamination of the oil within tank 11 which can occur during actuation of the open expulsion fuse link element. Thus, any contamination attendant to fuse link operation is minimized and can occur only during low fault clearing operations. Of course the necessary operational characteristics of linke 174 for the purposes outlined can be varied to suit different situations, and such modifications are well-known.

Fuse assembly 170 also includes an elongated bayonet member in the form of an insulative rod 184 which is secured at the lowermost end thereof to a circular contact plate 186. The latter is threadably secured to the upper end of current limiting fuse 178 and include a longitudinally tapered, continuous outer wall which is adapted to snugly fit within ring 150 of midsection 134 and engage the respective contacts 156. The upper end of rod 184 is secured to an annular cap 188 having an eyelet 190 thereon and a radially extending abutment flange 192. As best seen in FIGS. 3 and 4, the flange 192 of each cap 188 includes an annular gasket which engages the upper periphery of the associated tubular section 168. Thus the cap 188 serves as stop structure to limit the movement of fuse assembly 170 within the fuse well, while reception of fuse tube 172 within aperture 142 and contact plate 186 within ring 150 acts to stabilize the fuse assembly in place.

The current path through each fuse well-double fuse assembly 18 extends from the straps 120 and through each base section 132, fuse link 174, current limiting fuse 178, contact plate 186, spring contacts 156, ring 150 and strap 162.

When it is desired to refuse assembly 170 by replacing current limiting fuse 178 or link 174, it is only necessary to pull loadbreak elbows 222 from the affected phase lines by means of a hotline tool, whereupon the pressure (if any) within tank 12 should be relieved by opening valve 246 on wall 30. At this point the caps 188 are loosened and pulled free by means of a hotline tool, this being a live-break operation. The assemblies 170 are then withdrawn slowly from the associated fuse wells to permit oil on the fuse assemblies to drip back into tank 12. The necessary fuses are then replaced and the assemblies are checked for continuity, whereupon the refused assemblies 170 are reinserted and the elbows 222 reattached.

The primary bushings 20 each extend through forward wall 30 of tank 12 and are secured in place by means of separate attachment rings 194 which are slipped over threaded studs 196 extending outwardly from wall 30 for this purpose. As illustrated, each bushing 20 includes an elongated central metallic contact pin 198 which is threaded at opposite ends thereof and surrounded by a sleeve 200 of insulative synthetic resin material. Referring specifically to FIG. 1, it will be seen that each bushing 20 adapted to fit within a conventional, generally T-shaped dead-break terminator 202 which is each connected to a respective primary phase line 204 which extends upwardly through the open frame structure 38.

Tap line bushing wells 22 extend through rear wall 32 and are configured to present a generally cup-like recess 206 therein. The main body portions 208 of the bushing wells are formed of insulative, synthetic resin material and surround a central, threaded conductive stud 210 which is connected by means of nut 212 to a conductive strap 162 also secured to the associated fuse well assembly as explained. Each bushing 22 is secured by means of an annular attachment ring 214 which bears against a radially expanded portion 216 of each main body 208 and is held in place by threaded studs 218 secured to wall 32.

Connection to tap lines 220 (FIG. 2) is achieved by provision of conventional load-break bushings (not shown) which are screwed into the respective bushing wells 22 and which are configured to receive standard L-shaped load break elbows 222.

As best seen in FIGS. 1, 2 and 4, the front wall 30 and rear wall 32 of tank 12 are each provided with a respective outwardly extending ground buss bar 224 and 226. The separate buss bars are secured to the corresponding tank walls and extend across the latter. Buried grounding rods (not shown) are electrically connected to the buss bars for safely grounding tank 12 against faults which could cause electrocution to persons coming into contact with the metallic tank walls. In addition, a section of the outermost copper stranding around the primary and tap lines is preferably secured to the adjacent buss bar for grounding the lines (which are generally of the concentric neutral type), so that switchgear 10 can be operated in the safest possible manner.

Figure 9:
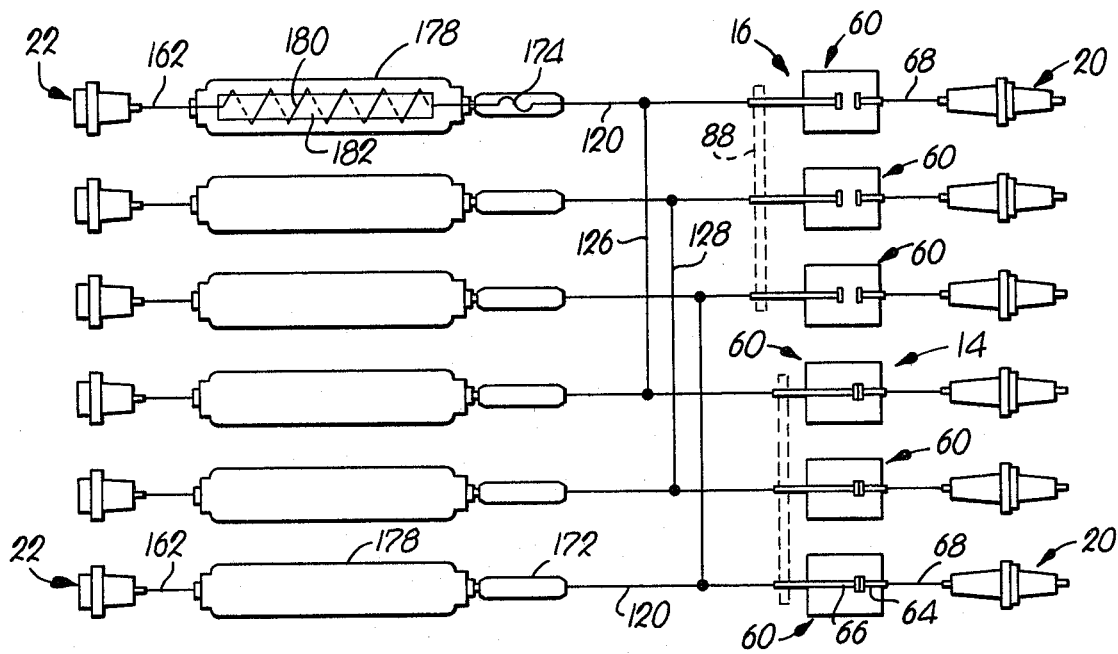
FIG. 9 is an essentially schematic plan view illustrating the electrical connection between the respective vacuum switch elements and double fuse assemblies.

Referring now to FIG. 9, it will be seen that each of the six primary line bushings 20 are electrically connected by means of a strap 68 to a corresponding vacuum switch element 60 having separable electrical contacts 64 and 66 therein. In the Figure, the bank 14 of switch elements is shown in the closed position, while the adjacent bank 16 is shown in the open position. As explained, each switch element 60 of the respective banks is operated in unison by means of a common operating bar 88.

The load sides of each of the switch elements 60 are connected by means of straps 120 to a corresponding double-fused protective assembly 170 which inlcudes a current limiting fuse 178 and an expulsion fuse link 174. The two fuse elements are connected in series, and a conductive strap 162 interconnects the load side of current limiting fuse 178 and the corresponding tap line bushing wells 22. Finally, the respective buss bars 124, 126 and 128 extend between corresponding switch elements 60 in each bank thereof for maintaining the proper circuit phase relationship through the switchgear apparatus.

As can be appreciated from a study of FIG. 9. switchgear 10 is especially adapted for use in so-called "loop" electrical systems either of the open or through variety. In such systems a plurality of switchgears could be located between separate substations with the underground electrical lines extending between the substations and electrically interconnecting the respective switchgears in series through the banks of switch elements in each switchgear 10. In addition, tap or branch line conductors attached to the load sides of the switchgear apparatus serve to distribute the electrical power from these substations. Through the use of a series of selectively openable and closable switchgear apparatus in accordance with the invention, it is possible to feed all of the branch circuits from one terminal substation, in the event that the other substation becomes inoperative. In more normal situations however, one bank of a selected switchgear could be left open so that the load on the substations is shared with each serving certain of the branch circuits.

During normal operation of switchgear 10, the electrical load is carried and switched in accordance with the operational configuration thereof. However, in the event of a downstream fault, the double-fuse protective assemblies within the switchgear serve to protect the latter as well as downstream electrical equipment. Moreover, if a fault occurs on the downstream side of switchgear 10, both the upstream and downstream equipment are protected by the fuse assemblies. In the instance of a high-level fault, current limiting fuses 178 will actuate in the known manner to quickly clear the fault before damage is done, and in preferred forms links 174 will not actuate during the sequence. In the case of the more common low-level faults, expulsion links 174 effectively clear the fault by melting or severing in the conventional way.

It is also significant that use of the double-fuse protective apparatus hereof synergistically maintains and even enhances desirable system coordination. That is, link 174 an fuse 178 in combination provide an appropriate, relatively narrow $I^2t$ band response over the entire fault range which cannot not be effectively matched which, for example, a single current limiting fuse of the full-range variety. In practice, fuse link 174 is selected in accordance with the known safe loading characteristics of the switchgear and the equipment to be protected, the anticipated level of fault currents and other factors ensuring that proper system coordination is maintained. When such a link is used in series with a high range back-up current limiting fuse of the type disclosed in U.S. Pat. No. 3,063,187, full-range protection is obtained without sacrifice of system coordination.

It should also be noted that use of vacuum switch elements and protective fuse equipment in an oil tank allows for significant size and cost savings notwithstanding the fact that the switchgear has a rated load capability sufficient for present and anticipated future underground systems. As discussed above, a prime concern with underground systems is in providing aesthetically pleasing, relatively unobtrusive pad-mounted equipment which can be safely placed in residential and commercial areas, and the present switchgear is admirably suited for this purpose.

Figure 7:
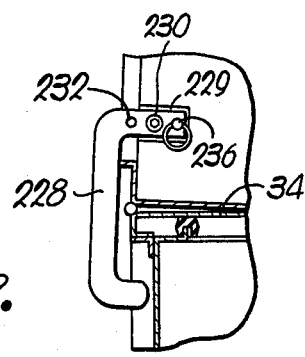
FIG. 7 is a fragmentary view in vertical section of the generally C-shaped stop element in its movement-blocking disposition for blocking inadvertent closing of a cover of the switchgear apparatus.

Another feature of the present invention resides in the safety structure employed for maintaining the respective covers 42 and 52 in an open position as desired. Specifically, referring to FIGS. 1, 2 and 7, it will be seen that a pair of generally C-shaped members 228 are positioned adjacent the side margins of the covers and are of length and configuration for bridging the hinged connection between the oil tank and covers when the latter are opened. One leg of each of the C-shaped members 228 is pivotally secured to a mounting block 229 on the sidewall of the covers by means of a pin 230. In addition, a pair of spaced, latch pin-receiving apertures 232 and 234 are provided through each member 228 on either side of pin 230, with a single aperture in the mounting block 229 located to register with the apertures 232 and 234 when the member 228 is rotated between its storage and operative positions. When it is desired to open the covers 42 or 52, the latter are simply swung open as illustrated in FIGS. 1 and 2, whereupon the appropriate C-shaped members 228 associated with the covers are pivoted downwardly to their movement-blocking disposition as best seen in FIG. 7 where the lower legs of the members 228 are disposed for engagement with the proximal walls 30 and 32 in order to prevent accidental closing of the cover. This is accomplished by removing latch pins 236 from the positions thereof shown in FIG. 4 for example, pivoting the members 228 downwardly, and reinserting the latchpins in the appropriate apertures for locking the C-shaped members in the operative disposition thereof shown in FIGS. 1, 2 and 7. A reversal of this procedure is of course followed when it is desired to close the covers 42 or 52 so that the members 228 are stored in a recessed position within the corresponding covers.

Figure 8:
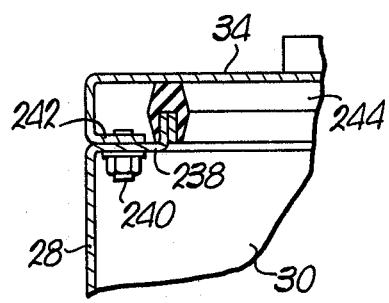
FIG. 8 is a fragmentary, vertical sectional view taken along line 8—8 of FIG. 4 and depicting the sealed connection between the end walls and lid of the switchgear tank.

It should also be noted that lid 34 of tank 12 is secured in place by means of internal studs only which improves the tamper resistance of the tank. Referring specifically to FIGS. 4 and 8, it will be seen that sidewall 28 is provided with an inwardly extending lip section 238 which is apertured to receive stud 240. In addition, lid 34 includes an apertured, inturned section 242 which engages section 238 and is secured to the latter by means of the nut secured to stud 240. Finally, a flexible rubber-like sealing band 244 extends along the length of sidewall 28 as well as around the periphery of the remaining walls defining tank 12, as will be seen from a study of the Figures, in order to provide a seal for the lid.

Having thus described the invention, what is claimed as new and desired to be secured by Letters Patent is:

1. High voltage, double-fused switchgear apparatus, comprising:
    a tank adapted to hold a supply of fluid dielectric material;
    a switch element positioned within said tank below the normal level of dielectric therein and including separable electrical contacts and mechanism for selectively opening and closing the contacts for interrupting and establishing a current path through the switch element as desired;
    a fuse assembly including a current limiting fuse, an expulsion-type fuse link, and means electrically connecting the fuse link and current limiting fuse in series;
    means for mounting said fuse assembly in series with said switch element in said tank below the normal dielectric level therein and in relatively close physical proximity to the switch element.

2. Apparatus as set forth in claim 1 wherein said fuse link is fusible in response to a fault current passing therethrough, and also to a rise in temperature within said tamk to a predetermined level.

3. Apparatus as set forth in claim 1 wherein said current limiting fuse and fuse link are cooperatively constructed such that, under the influence of a fault current of relatively high magnitude, only said current limiting fuse will activate in order to minimize contamination of said dielectric material.

4. Apparatus as set forth in claim 1 wherein said apparatus includes at least a pair of separate switch elements, a fuse assembly for each switch element, and means electrically connecting the switch elements in series.

5. Apparatus as set forth in claim 1 wherein said switch element includes a vacuum housing with said contacts disposed therein.

6. Apparatus as set forth in claim 1 wherein said mechanism includes manually operable manipulative means situated externally of said tank for opening and closing said switch element.

7. Apparatus as set forth in claim 1 wherein said mounting means serves to removably position said fuse assembly within said tank.

8. Apparatus as set forth in claim 1 including:
two sets of switch elements each having a total of three switch elements therein;
respective means electrically connecting in series corresponding switch elements in said sets for defining three series-related pairs thereof;
means coupling the respective opening and closing mechanisms of the switch elements in each set thereof for opening and closing operation of the switch elements in each set in unison; and
separate fuse assemblies for each of said switch elements, and means electrically connecting in series each fuse assembly and the corresponding switch element.

9. Apparatus as set forth in claim 1 including first line connecting means extending through a wall of said tank and electrically connected in series with said switch element on the source side of the latter.

10. Apparatus as set forth in claim 1 including second line connecting means extending through a wall of said tank and electrically connected in series with said fuse assembly on the source side of the latter.

11. Combination fuse well and fusing apparatus, comprising:
a fuse well assembly including a base, a midsection, a generally tubular upper section having stop structure thereon, and means for maintaining the base, midsection and upper section in spaced, generally axially aligned disposition with the base and midsection being electrically separate;
an elongated fuse assembly removably positioned within said well in bridging disposition to said base and midsection; and
an elongated bayonet member secured to the upper end of said fuse assembly and extending into said upper member, said bayonet member including an elongated shaft having structure thereon for engaging said stop structure on the upper section for limiting the movement of said fuse assembly within said well and stabilizing the fuse assembly within the latter,
said base being apertured, and the lowermost end of said fuse assembly being complementally received within said aperture,
said fuse assembly including an elongated, enclosed current limiting fuse having a radially enlarged, conductive flange secured to the upper end thereof and complementally received by said midsection, and an elongated fuse tube having an expulsion-type fuse link therein, said tube being secured to the lower end of said current limiting fuse and received within said aperture.

12. Apparatus as set forth in claim 11 wherein said fuse link is fusible in response to a fault current passage therethrough, and also to a rise in temperature of the medium surrounding the link to a predetermined level.

13. Apparatus as set forth in claim 11 wherein said current limiting fuse and fuse link are cooperatively constructed such that, under the influence of a fault current of relatively high magnitude, only said current limiting fuse will activate.

* * * * *